United States Patent
Day et al.

(10) Patent No.: US 11,316,222 B2
(45) Date of Patent: Apr. 26, 2022

(54) SYSTEM AND METHOD FOR MAINTAINING THERMAL CONTROL OF BATTERY CELLS

(71) Applicant: The Boeing Company, Chicago, IL (US)

(72) Inventors: Gregory R. Day, Madison, AL (US); Dennis L. Coad, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 16/242,948

(22) Filed: Jan. 8, 2019

(65) Prior Publication Data
US 2020/0220120 A1    Jul. 9, 2020

(51) Int. Cl.
| H01M 50/116 | (2021.01) |
| H01M 10/613 | (2014.01) |
| H01M 10/658 | (2014.01) |
| H01M 50/581 | (2021.01) |

(52) U.S. Cl.
CPC ....... H01M 50/116 (2021.01); H01M 10/613 (2015.04); H01M 10/658 (2015.04); H01M 50/581 (2021.01)

(58) Field of Classification Search
CPC ..... H01M 5/16; H01M 10/613; H01M 10/658
See application file for complete search history.

(56) References Cited

U.S. PATENT DOCUMENTS

| 10,439,178 | B2 * | 10/2019 | Morioka | H01M 50/502 |
| 2010/0044841 | A1 * | 2/2010 | Mahler | H01L 23/3142 |
| | | | | 257/675 |
| 2013/0236759 | A1 * | 9/2013 | Kusaba | H01M 50/20 |
| | | | | 429/99 |
| 2014/0060811 | A1 * | 3/2014 | Mazyar | E21B 10/22 |
| | | | | 166/118 |
| 2017/0162839 | A1 * | 6/2017 | Botadra | H01M 50/267 |
| 2019/0020001 | A1 * | 1/2019 | Nakano | H01M 50/383 |

FOREIGN PATENT DOCUMENTS

| CN | 107611312 A | 1/2018 |
| JP | 2018029006 A * | 2/2018 | H01G 11/84 |
| JP | 2018029006 A | 2/2018 |
| WO | 2019001304 A1 | 1/2019 |

OTHER PUBLICATIONS

Extended European Search Report dated Jun. 4, 2020 in corresponding European Application No. 19212379.2, 8 pages.
(Continued)

*Primary Examiner* — Karie O'Neill Apicella
(74) *Attorney, Agent, or Firm* — MH2 Technology Law Group LLP

(57) ABSTRACT

A system includes a cell support and an insulator. The cell support has an opening defined therethrough. The opening is configured to have a battery cell positioned at least partially therein. The insulator is positioned at least partially within the opening. The insulator is configured to be positioned between the battery cell and the cell support such that the insulator electrically-insulates the cell support from the battery cell.

20 Claims, 3 Drawing Sheets

(56) References Cited

OTHER PUBLICATIONS

Paraliev et al., "Experimental Study of Diamond Like Carbon (DLC) Coated Electrodes for Pulsed High Gradient Electron Gun," Power Modulator and High Voltage Conference, Atlanta, GA, USA, 2010.

Wu et al., "Electronic Power System Application of Diamond-Like Carbon Films," NASA/CP-2003-212319, Aug. 18, 2003, pp. 324-327.

Wu et al., Diamond-Like Carbon Capacitors for High Voltage High Energy Density Operations, Carts USA 2005, Mar. 21-24, 2005, Palm Springs, CA, pp. 89-93.

* cited by examiner

SYSTEM AND METHOD FOR MAINTAINING THERMAL CONTROL OF BATTERY CELLS

FIELD OF THE DISCLOSURE

The present disclosure is directed to systems and methods for maintaining thermal control of battery cells. More particularly, the present disclosure is directed to systems and methods for maintaining thermal control of battery cells during normal and abnormal (e.g., thermal runaway) conditions.

BACKGROUND

Modern battery assemblies can include one or more (e.g., hundreds of) cells that use a common form factor size, such as cylindrical, pouch, or prismatic. The cells may be or include lithium-ion (Li-ion) cells, which are sensitive to high temperatures. At temperatures above, for example, about 90° C., the cells may progress into thermal runaway.

Thermal runaway occurs in situations where an increase in a temperature of the battery cell causes a further increase in the temperature of the battery cell. It is a type of uncontrolled positive feedback. During thermal runaway, cell temperatures can reach or exceed about 800° C., and cell vent gas temperatures can reach or exceed about 1000° C. At these temperatures, adjacent cells may also be driven into thermal runaway, allowing the problem to propagate.

One cooling approach that is currently used to prevent the cells from entering thermal runaway is convective cooling, which involves blowing cool air across the exposed portions of the cells. Convective cooling works well for ground-based and low-altitude applications. However, fans are needed to create the necessary air flow, and ductwork is needed to direct the air flow to the cells.

SUMMARY

A system includes a cell support and an insulator. The cell support has an opening defined therethrough. The opening is configured to have a battery cell positioned at least partially therein. The insulator is positioned at least partially within the opening. The insulator is configured to be positioned between the battery cell and the cell support such that the insulator electrically-insulates the cell support from the battery cell.

In another implementation, the system includes a first cell support having a plurality of first openings defined therethrough, and a second cell support having a plurality of second openings defined therethrough. The system also includes a plurality of battery cells. A first end of each battery cell is positioned in one of the first openings, and a second, opposing end of each battery cell is positioned in one of the second openings. The system also includes plurality of first insulators. The first insulators are configured to be positioned at least partially between the battery cells and the first cell support to electrically-insulate the first cell support. The system also includes a plurality of second insulators. The second insulators are configured to be positioned at least partially between the battery cells and the second cell support to electrically-insulate the second cell support.

A method is also disclosed. The method includes positioning an insulator into an opening formed in a cell support. The cell support is metallic and has a thermal conductivity from about 130 watts per meter-kelvin (W/m*K) to about 210 W/m*K, and an electrical resistivity from about 1 micro-ohm per centimeter ($\mu\Omega$/cm) to about 20 $\mu\Omega$/cm. The insulator has a thermal conductivity from about 0.1 W/m*K to about 5 W/m*K, and an electrical resistivity from about 1E4 ohms per meter ($\Omega$/m) to about 1E12 $\Omega$/m. The method also includes positioning an adhesive into the opening such that the insulator is positioned radially-between the adhesive and the cell support. The method also includes positioning a cell at least partially into the opening such that the adhesive is positioned radially-between the cell and the insulator.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
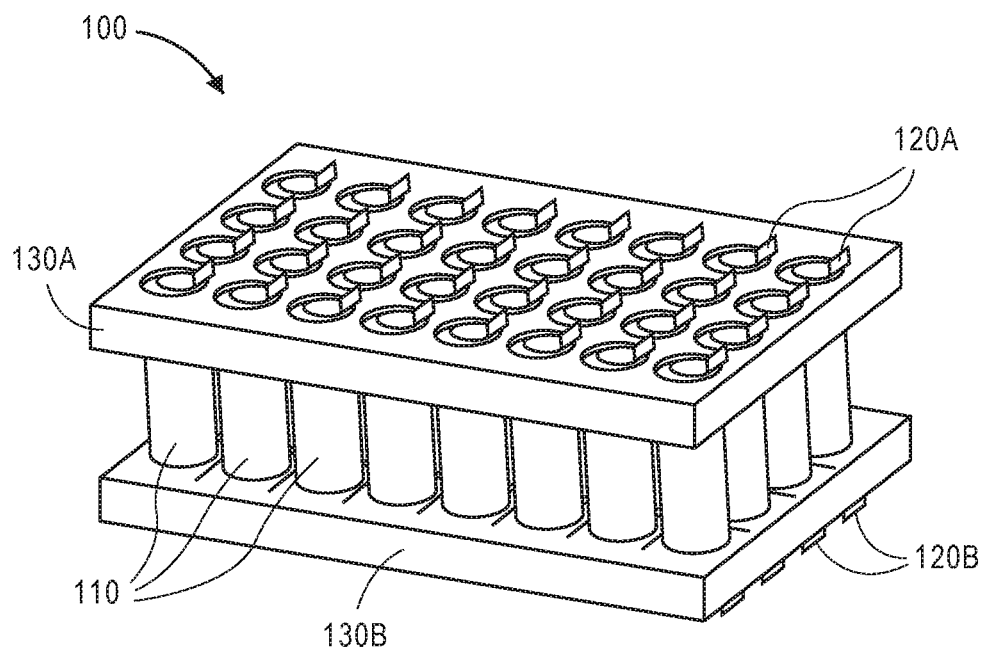
FIG. 1 illustrates a perspective view of a system for maintaining thermal control of one or more battery cells, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The system and method disclosed herein may be configured to prevent propagation of a thermal runaway event from one battery cell to one or more neighboring battery cells. More particularly, the system and method may ensure that, if any single cell has a failure and enters thermal runaway, a thermally-conductive insulator can conduct the heat/energy from the failing cell to thermally-conductive cell supports, which can dissipate the heat/energy across the entire system, rather than allowing the heat/energy to be concentrated around the failing cell, which may induce the neighboring cells into thermal runaway. Thus, the system may leverage the thermal inertia of the cell supports to ensure that no hot spots are created, thereby precluding other cells from entering thermal runaway.

FIG. 1 illustrates a perspective view of a system (also referred to as a cell assembly) 100 for maintaining thermal control of battery cells 110 (hereinafter "cells"), according to an implementation. The cells 110 may be or include lithium-ion (Li-ion) cells. In addition, the cells 110 may be or include 18650 cells, 21700 cells, D cells, or a combination thereof. However, in other implementations, the cells 110 may be or include other/different types, shapes, and/or sizes.

The system 100 may include a plurality of first cell tabs 120A and a plurality of second cell tabs 120B. More particularly, the first cell tabs 120A may be in contact with the upper ends (e.g., the positive terminals) of the cells 110, and the second cell tabs 120B may be in contact with the lower ends (e.g., the negative terminals) of the cells 110. The first cell tabs 120A and the second cell tabs 120B may be made of an electrically-conductive (e.g., metallic) material that is configured to conduct electrical current from the cells 110 to an electrical load.

Figure 2:
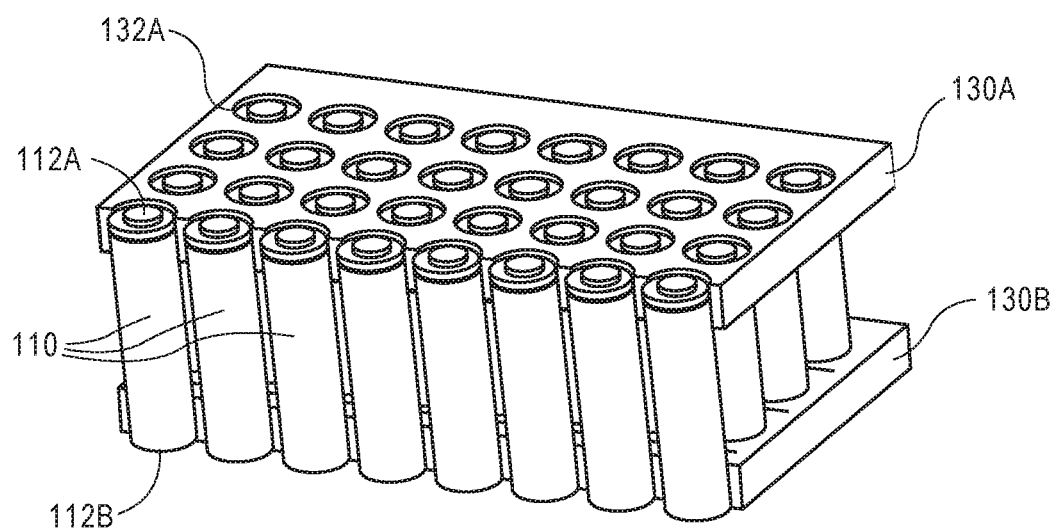
FIG. 2 illustrates a perspective view of the system from FIG. 1 with portions of first and second cell supports removed to more clearly show the battery cells, according to an example.

FIG. 2 illustrates a perspective view of the system 100 with portions of first and second cell supports 130A, 130B removed. Referring to FIGS. 1 and 2, the system 100 may also include a first (e.g., upper) cell support 130A and a second (e.g., lower) cell support 130B. If a single cell support is used, it may extend the full length of the cell.

The first cell support 130A may include one or more openings 132A, and the second cell support 130B may include one or more openings 132B. The openings 132A, 132B in the first and second cell supports 130A, 130B may be formed partially or completely therethrough, and the openings 132A, 132B in the first and second cell supports 130A, 130B may be shaped and sized to at least partially receive the cells 110. As shown, both the cells 110 and the openings 132A, 132B in the first and second cell supports 130A, 130B are substantially cylindrical. Thus, a first (e.g., upper) end 112A of each cell 110 (e.g., including the positive terminal) may be positioned at least partially within a corresponding opening 132A formed in the first cell support 130A, and a second (e.g., lower) end 112B of each cell 110 (e.g., including the negative terminal) may be positioned at least partially within a corresponding opening 132B formed in the second cell support 130B.

As described in greater detail below, the system 100 uses conductive cooling, instead of or in addition to convective cooling, to maintain thermal control of the cells 110. This helps prevent the cells 110 from entering thermal runaway. In addition, in the event that one cell 110 enters thermal runaway, this may help prevent that cell 110 from inducing neighboring cells 110 to also enter thermal runaway. In general, conductive cooling pulls heat from each of the cells 110 and distributes the heat across the first cell support 130A, the second cell support 130B, and battery pack, as described below.

Conventional conductive cooling systems include cell supports that are made of a ceramic material (with no insulator). The ceramic material may be thermally-conductive and non-electrically-conductive (e.g., to prevent short-circuits between the cells 110). However, the ceramic material may be brittle, hard to manufacture, and expensive. Other conventional cooling systems may include placing the negative ends of the cells on an electrically-isolative pad that is over a metallic substrate that can conduct the heat away. The contact area available for heat transfer, however, is limited to the end of the cell.

Accordingly, the first cell support 130A and the second cell support 130B disclosed herein may be made of a different material instead of, or in addition to, ceramic material. Thus, in one implementation, the first cell support 130A and/or the second cell support 130B may not include a ceramic material. For example, the first cell support 130A and/or the second cell support 130B can be made at least partially from aluminum (e.g., Al 6061), which is both thermally-conductive and electrically-conductive.

For example, the first cell support 130A and/or the second cell support 130B can have a thermal conductivity from about 130 watts per meter-kelvin (W/m*K) to about 210 W/m*K, about 150 watts per meter-kelvin (W/m*K) to about 190 W/m*K, or about 170 watts per meter-kelvin (W/m*K) to about 190 W/m*K. This thermal conductivity allows the first cell support 130A and the second cell support 130B to provide a heat transfer path for waste heat from the cells 110. By providing a first cell support 130A and a second cell support 130B that can be used for conductive heat transfer, the cell area in contact can be many times greater than conventional systems, resulting in higher heat transfer rates and thus cooler cells (or the ability to run the cells at higher discharge rates).

The first cell support 130A and the second cell support 130B may have an electrical resistivity from about 1 micro-ohm ($\mu\Omega$) per centimeter (cm) to about 20 $\mu\Omega$/cm, about 1 $\mu\Omega$/cm to about 15 $\mu\Omega$/cm, or about 1 $\mu\Omega$/cm to about 10 $\mu\Omega$/cm. This electrical conductivity/resistivity allows the first cell support 130A and the second cell support 130B to be made of a more robust material (e.g., aluminum) that is easy to manufacture and less expensive than ceramic material.

Figure 3:
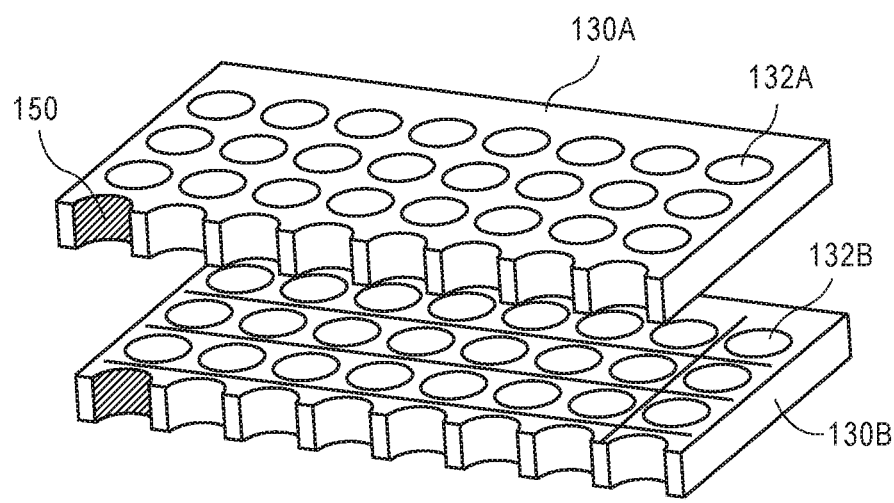
FIG. 3 illustrates a perspective view of the system of FIG. 2 with the battery cells removed to more clearly show the openings in the first and second cell supports, according to an example.
Figure 4:
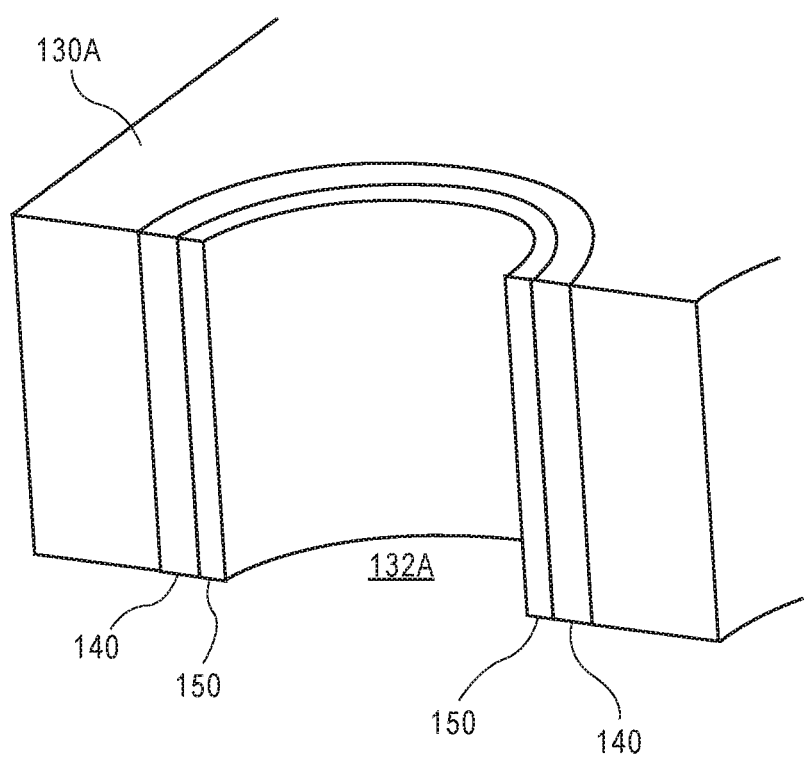
FIG. 4 illustrates an enlarged, perspective, cross-sectional view of one of the openings in the first cell support, according to an example.

FIG. 3 illustrates a perspective view of the system 100 with the battery cells 110 removed, and FIG. 4 illustrates an enlarged perspective view of one of the openings 132A in the first cell support 130A, according to an example. When using the first cell support 130A and the second cell support 130B, which are electrically-conductive, the system 100 can include one or more insulators 140 positioned at least partially in the openings 132A, 132B in the first and second cell supports 130A, 130B (i.e., between the cells 110 and the first and second cell supports 130A, 130B). In the implementation shown, the insulators 140 may be positioned radially-between the cells 110 and the first and second cell supports 130A, 130B. For example, the insulators 140 may be positioned on inner circumferential surfaces of the first and second cell supports 130A, 130B that define the openings 132A, 132B in the first and second cell supports 130A, 130B. This positioning may provide the thermal and electrical benefits described below. As such, the insulators 140 may be at least partially annular and have a (radial) thickness 142 that is less than about 50 micrometers ($\mu$m), less than about 25 $\mu$m, less than about 10 $\mu$m, or less than about 5 $\mu$m. This thickness may allow the insulators 140 to be positioned between the cells 110 and the first and second cell supports 130A, 130B without requiring the cells 110 or the openings 132A, 132B in the first and second cell supports 130A, 130B to be re-sized.

The insulators 140 may electrically-insulate the first and second cell supports 130A, 130B from the cells 110. In other words, the insulators 140 reduce or prevent the electrical current from being conducted from the cells 110 to the first and second cell supports 130A, 130B. In one implementation, the insulators 140 can be at least partially made from diamond-like carbon (DLC). The DLC is a class of amorphous carbon materials that displays some of the properties of diamond, such as hardness, toughness, wear-rate, electrical conductivity/resistivity, thermal conductivity, etc. The DLC may exist in one or more different forms. One or more of the forms may include at least a predetermined amount of $sp^3$ hybridized carbon atoms. The different forms of DLC may include at least two crystalline polytypes. One polytype has its carbon atoms arranged in a cubic lattice, while another polytype has its carbon atoms arranged in a hexagonal lattice. By mixing these polytypes in various ways at the nanoscale level, a DLC coating may be produced that is amorphous, flexible, and purely $sp^3$ bonded diamond. In one example, one form of DLC may be or include tetrahedral amorphous carbon.

The insulators 140 (e.g., made of the DLC) are thermally-conductive and non-electrically-conductive. For example, the insulators 140 (e.g., made of the DLC) may have a thermal conductivity from about 0.1 W/m*K to about 5 W/m*K, about 0.5 W/m*K to about 3.5 W/m*K, or about 1 W/m*K to about 2.5 W/m*K. The insulators 140 may have an electrical resistivity from about 1E4 ohms per meter (Ω/m) to about 1E12 Ω/m, about 1E5 Ω/m to about 1E11 Ω/m, or about 1E6 Ω/m to about 1E10 Ω/m. Accordingly, the insulators 140 (e.g., made of the DLC) can conduct a large portion of the heat from the cells 110 to the first and second cell supports 130A, 130B while substantially preventing the electrical current from being conducted from the cells 110 to the first and second cell supports 130A, 130B. This may be the case even when the cells 110 have individual or aggregate voltages up about 500 volts (V), up to about 750 V, or up to about 1000 V.

As shown in FIG. 4, in at least one implementation, an adhesive 150 may also be positioned at least partially in the openings 132A, 132B in the first and second cell supports 130A, 130B (i.e., between the cells 110 and the first and second cell supports 130A, 130B). In the implementation shown, the adhesive 150 may be positioned radially-between the cells 110 and the insulators 140. For example, the adhesive 150 may be positioned on inner circumferential surfaces of the insulators 140. The adhesive 150 may serve to bond the cells 110 to the insulators 140. In another implementation, the adhesive 150 may be positioned radially-between the insulators 140 and the first and second cell supports 130A, 130B. In this instance, the adhesive 150 may serve to bond the insulators 140 to the first and second cell supports 130A, 130B. The adhesive 150 (e.g., when cured) may be at least partially annular and have a (radial) thickness 152 that is less than about 160 micrometers (μm), less than about 130 μm, or less than about 100 μm. In yet another implementation, the adhesive 150 may be omitted.

Figure 5:
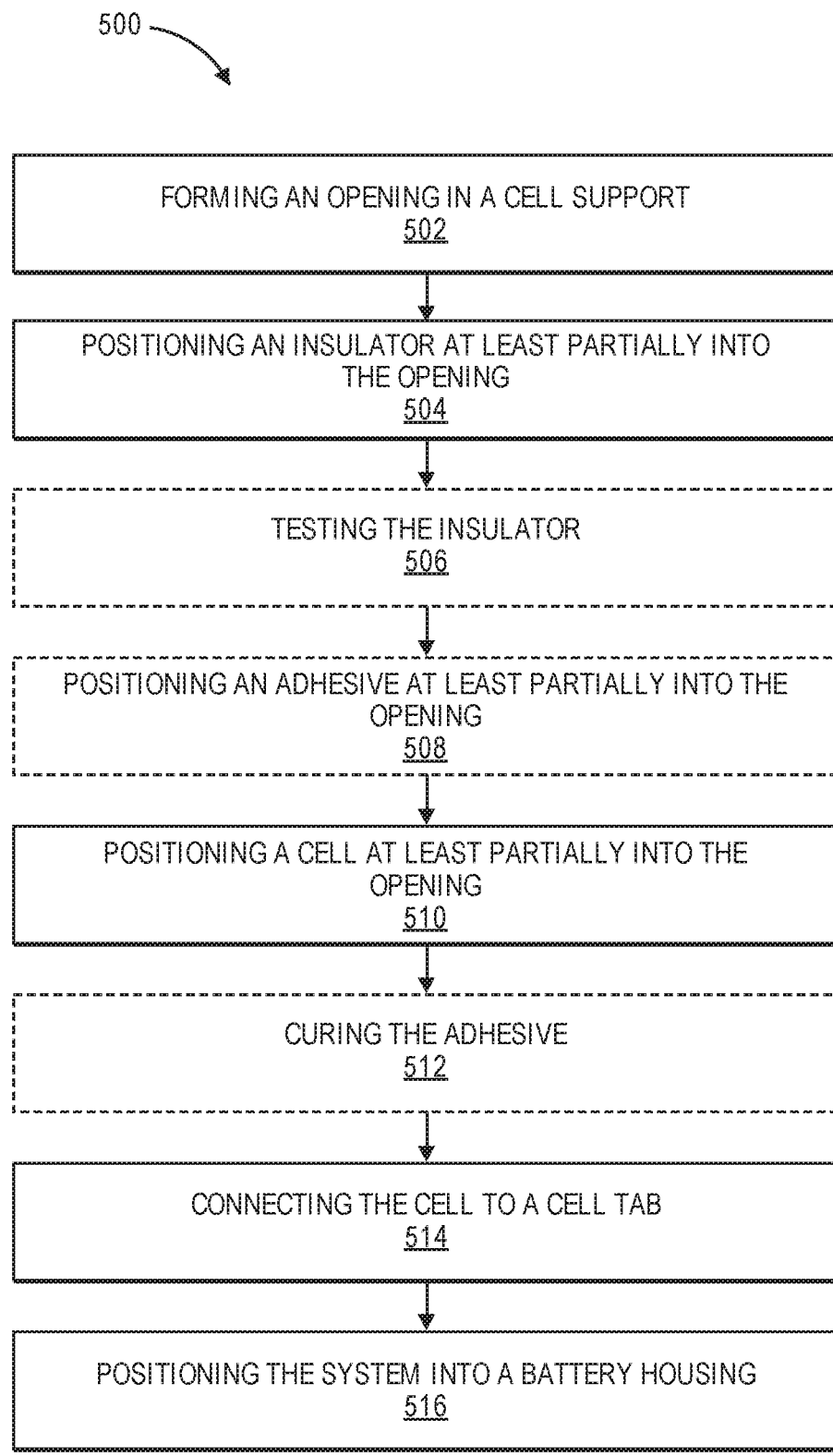
FIG. 5 illustrates a flowchart of a method for maintaining thermal control of one or more battery cells, according to an implementation.

FIG. 5 illustrates a flowchart of a method 500 for maintaining thermal control of one or more battery cells 110, according to an implementation. The method 500 may include forming one or more openings 132A, 132B in the first and second cell supports 130A, 130B, as at 502. More particularly, this can include forming the first openings 132A in the first cell support 130A and the second openings 132B in the second cell support 130B. The openings 132A, 132B in the first and second cell supports 130A, 130B may be formed by drilling, machining, etc.

The method 500 includes positioning the insulators 140 at least partially into the openings 132A, 132B in the first and second cell supports 130A, 130B, as at 504. In one implementation, the insulators 140 may be or include a liquid, a paste, a gel, or a combination thereof, which may be applied to inner circumferential surfaces of the first and second cell supports 130A, 130B that define the openings 132A, 132B in the first and second cell supports 130A, 130B. In this implementation, the insulators 140 may be applied to openings 132A, 132B in the first and second cell supports 130A, 130, even when the openings 132A, 132B in the first and second cell supports 130A, 130 have different sizes (e.g., diameters).

In another implementation, the insulators 140 may be in the form of solid annular inserts that are positioned at least partially within the openings 132A, 132B in the first and second cell supports 130A, 130B. In this implementation, the inserts may be pre-made and quickly installed. The inserts may remain in place via a friction fit.

In another implementation, the insulators 140 may be positioned/applied to inner circumferential surfaces of the first and second cell supports 130A, 130B that define the openings 132A, 132B in the first and second cell supports 130A, 130B via ion beam direct deposition (line of sight). In yet another implementation, the insulators 140 may be positioned/applied to inner circumferential surfaces of the first and second cell supports 130A, 130B that define the openings 132A, 132B in the first and second cell supports 130A, 130B via radio-frequency (RF) plasma chemical vapor deposition (CVD). In the ion beam direct deposition and the plasma CVD implementations, the insulators 140 may be applied to openings 132A, 132B in the first and second cell supports 130A, 130B, even when the openings 132A, 132B in the first and second cell supports 130A, 130 have different sizes (e.g., diameters).

In each of these examples above, the insulators 140 may provide a thermally-conductive, but non-electrically-conductive, medium between the cells 110 and the first and second cell supports 130A, 130B.

The method 500 may optionally include testing the insulators 140, as at 506. This may include testing for electrical isolation and/or breakdown voltage to ensure that the insulators 140 provide electrical isolation between the cells 110 and the first and second cell supports 130A, 130B.

The method 500 can optionally include positioning the adhesive 150 at least partially into the openings 132A, 132B in the first and second cell supports 130A, 130B, as at 508. As mentioned above, the adhesive 150 may be positioned radially-between the cells 110 and the insulators 140 and/or between the insulators 140 and the first and second cell supports 130A, 130B.

The method 500 may also include positioning the cells 110 at least partially into the openings 132A, 132B in the first and second cell supports 130A, 130B, as at 510. The cells 110 may be introduced at least partially into the openings 132A, 132B in the first and second cell supports 130A, 130B after the insulators 140 and/or the adhesive 150 are introduced into the openings 132A, 132B in the first and second cell supports 130A, 130B. The adhesive 150 may adhere/bond the cells 110 to the insulators 140.

The method 500 may optionally include curing the adhesive 150, as at 512. The adhesive 150 may be cured by heating. In other examples, the adhesive 150 may cure at ambient temperature.

The method 500 may also include connecting the cells 110 to the first cell tabs 120A and/or the second cell tabs 120B, as at 514. More particularly, this may include connecting the first ends 112A (e.g., the positive terminals) of the cells 110 to the first cell tabs 120A, and connecting the second ends 112B (e.g., the negative terminals) of the cells 110 to the second cell tabs 120B so that the cells 110 may conduct electrical current through the first cell tabs 120A and/or the second cell tabs 120B to an electrical load.

The method 500 may also include positioning the system 100 (also referred to as a cell assembly) into a battery housing, as at 516.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A system, comprising:
   a cell support having first and second openings defined therethrough, wherein the first and second openings have different sizes, wherein the first opening is configured to have a first battery cell positioned at least partially therein, wherein the second opening is configured to have a second battery cell positioned at least partially therein, and wherein the first and second battery cells have different sizes;
   a first insulator positioned at least partially within the first opening and at least partially around the first battery cell; and
   a second insulator positioned at least partially within the second opening and at least partially around the second battery cell,
   wherein the first and second insulators comprise solid diamond-like carbon inserts that fill a first gap between the first battery cell and the first opening and a second gap between the second battery cell and the second opening, wherein the first and second insulators electrically-insulate the cell support from the first and second battery cells, wherein, in response to the first battery cell, the second battery cell, or both entering thermal runaway, the first and second insulators are configured to conduct heat from the first battery cell, the second battery cell, or both to the cell support, and wherein the cell support is configured to distribute the heat throughout the cell support, which causes the heat to dissipate via conductive cooling to prevent the first battery cell, the second battery cell, or both from causing other battery cells in the system to enter thermal runaway.

2. The system of claim 1, wherein the cell support comprises aluminum.

3. The system of claim 1, wherein the cell support has a thermal conductivity from about 190 watts per meter-kelvin (W/m*K) to about 190 W/m*K, and an electrical resistivity from about 1 micro-ohm per centimeter ($\mu\Omega$/cm) to about 10 $\mu\Omega$/cm.

4. The system of claim 1, wherein the first insulator has a thermal conductivity from about 1 watt per meter-kelvin (W/m*K) to about 2.5 W/m*K, and an electrical resistivity from about 1E6 ohms per meter ($\Omega$/m) to about 1E10 $\Omega$/m.

5. The system of claim 1, wherein the first insulator is positioned on an inner circumferential surface of the cell support that defines the first opening, such that the first insulator is configured to be positioned radially-between the first battery cell and the cell support.

6. A system, comprising:
   a first cell support having a plurality of first openings defined therethrough, wherein the first openings are different sizes;
   a second cell support having a plurality of second openings defined therethrough, wherein the second openings are different sizes;
   a plurality of battery cells, wherein a first end of each battery cell is positioned in one of the first openings, wherein a second, opposing end of each battery cell is positioned in one of the second openings, and wherein the battery cells are different sizes;
   a plurality of first insulators, wherein the first insulators are configured to be positioned at least partially between the battery cells and the first cell support to electrically-insulate the first cell support; and
   a plurality of second insulators, wherein the second insulators are configured to be positioned at least partially between the battery cells and the second cell support to electrically-insulate the second cell support,
   wherein the first and second insulators comprise solid diamond-like carbon inserts that fill gaps between a first the first battery cells the first and second cell supports and fill gaps between a second of the battery cells and the first and second cell supports, wherein, in response to one of the battery cells entering thermal runaway, the first and second insulators are both configured to conduct heat from the one battery cell to the first and second cell supports, and wherein the first and second cell supports are both configured to distribute the heat throughout the first and second cell supports, which causes the heat to dissipate via conductive cooling to prevent the one battery cell from causing a remainder of the battery cells to enter thermal runaway.

7. The system of claim 6, wherein the first and second cell supports comprise aluminum.

8. The system of claim 7, wherein the first and second cell supports do not comprise ceramic material.

9. The system of claim 8, wherein the first and second cell supports have a thermal conductivity from about 130 watts per meter-kelvin (W/m*K) to about 210 W/m*K, and an electrical resistivity from about 1 micro-ohm per centimeter ($\mu\Omega$/cm) to about 20 $\mu\Omega$/cm.

10. The system of claim 9, wherein the diamond-like carbon has a thermal conductivity from about 0.1 watts per meter-kelvin (W/m*K) to about 5 W/m*K, and an electrical resistivity from about 1E4 ohms per meter (Ω/m) to about 1E12 Ω/m.

11. The system of claim 10, wherein each first insulator has a thickness that is less than or equal to about 10 micrometers.

12. The system of claim 11, wherein each first insulator is positioned on an inner circumferential surface of the first cell support that defines one of the first openings.

13. The system of claim 12, further comprising a first adhesive positioned radially-between the battery cells and the first insulators, and a second adhesive positioned radially-between the first insulators and the first cell support.

14. A method, comprising:
positioning insulators into first and second openings formed in a cell support, wherein the first and second openings have different sizes, and
wherein the cell support is metallic and has:
a thermal conductivity from about 130 watts per meter-kelvin (W/m*K) to about 210 W/m*K, and
an electrical resistivity from about 1 micro-ohm per centimeter (μΩ/cm) to about 20 μΩ/cm, and
wherein the insulators have:
a thermal conductivity from about 0.1 W/m*K to about 5 W/m*K, and
an electrical resistivity from about 1E4 ohms per meter (Ω/m) to about 1E12 Ω/m;
positioning an adhesive into the first and second openings such that the insulators are positioned radially-between the adhesive and the cell support; and
positioning battery cells at least partially into the first and second openings such that the adhesive is positioned radially-between the battery cells and the insulators,
wherein the insulators comprise solid diamond-like carbon inserts that fill gaps between the battery cells and the first and second openings, and
wherein, in response to one of the battery cells entering thermal runaway, at least one of the insulators is configured to conduct heat from the one battery cell to the cell support, and wherein the cell support is configured to distribute the heat throughout the cell support, which causes the heat to dissipate via conductive cooling to prevent the one battery cell from causing other battery cells to enter thermal runaway.

15. The system of claim 6, wherein the diamond-like carbon comprises a first crystalline polytype and a second crystalline polytype that are different from one another.

16. The system of claim 15, wherein the first crystalline polytype has carbon atoms arranged in a cubic lattice, and wherein the second crystalline polytype has carbon atoms arranged in a hexagonal lattice.

17. The system of claim 6, wherein the diamond-like carbon comprises tetrahedral amorphous carbon.

18. The system of claim 6, wherein a first of the battery cells comprises one of an 18650 cell, a 21700 cell, and a D cell, wherein a second of the battery cells comprises a different one of the 18650 cell, the 21700 cell, and the D cell, and wherein the first openings have different diameters.

19. The system of claim 6, wherein the first insulators remain in place between the battery cells and the first cell support via a friction fit.

20. The system of claim 6, wherein the first insulators are solid as they are inserted into the gaps.

* * * * *